United States Patent
Zeng et al.

(10) Patent No.: US 10,503,297 B2
(45) Date of Patent: Dec. 10, 2019

(54) MOBILE TERMINAL TOUCH CONTROL DISPLAY STRUCTURE AND MANUFACTURING METHOD THEREOF, MOBILE TERMINAL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhihui Zeng, Beijing (CN); Guangquan Wang, Beijing (CN); Haiwei Sun, Beijing (CN); Jian Sang, Beijing (CN); Zhiyong Chen, Beijing (CN); Enkai Dong, Beijing (CN); Yezhou Tan, Beijing (CN); Junjie Xie, Beijing (CN); Yun Qiao, Beijing (CN); Wei Gong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/759,623

(22) PCT Filed: Sep. 21, 2017

(86) PCT No.: PCT/CN2017/102769
§ 371 (c)(1),
(2) Date: Mar. 13, 2018

(87) PCT Pub. No.: WO2018/153079
PCT Pub. Date: Aug. 30, 2018

(65) Prior Publication Data
US 2019/0050094 A1 Feb. 14, 2019

(30) Foreign Application Priority Data

Feb. 23, 2017 (CN) .......................... 2017 1 0100544

(51) Int. Cl.
*G06F 3/041* (2006.01)
*G06K 9/00* (2006.01)
(Continued)

(52) U.S. Cl.
CPC .......... *G06F 3/0412* (2013.01); *G06F 1/1626* (2013.01); *G06F 3/0416* (2013.01);
(Continued)

(58) Field of Classification Search
CPC ............. G06K 9/00013; G06K 9/0002; G06K 9/00006; G06F 3/041; G06F 3/0412;
(Continued)

(56) References Cited

U.S. PATENT DOCUMENTS 9,710,689 B2 * 7/2017 Evans .................... G06F 1/1684
9,940,500 B2 * 4/2018 Liu ....................... G06K 9/0002
(Continued)

FOREIGN PATENT DOCUMENTS

| CN | 101655627 A | 2/2010 |
|---|---|---|
| CN | 105847467 A | 8/2016 |

(Continued)

OTHER PUBLICATIONS

First Office Action for CN Application No. 201710100544.9, dated Jan. 28, 2019.
(Continued)

*Primary Examiner* — Sardis F Azongha
(74) *Attorney, Agent, or Firm* — Foley & Lardner LLP; James F. Ewing; Paul M. H. Pua

(57) ABSTRACT

A mobile terminal touch control display structure and a manufacturing method thereof, and a mobile terminal are
(Continued)

disclosed. The mobile terminal touch control display structure comprises: a touch control display panel (20), a display region (21) of the touch control display panel (20) having an inwardly recessed irregular-shaped avoidance region (22) at an edge corresponding to a bottom of a mobile terminal, the touch control display panel (20) comprising a first substrate (23) and a second substrate (24) attached with each other, wherein the second substrate (24) is disposed close to a front panel of the mobile terminal, the second substrate (24) having a first inwardly recessed avoidance groove (241) at an edge corresponding to the irregular-shaped avoidance region (22); a transparent cover plate (10) positioned on a side of the second substrate (24) away from the first substrate (23), wherein the transparent cover plate (10) is provided with a receiving groove (11) in a region corresponding to the first avoidance groove (241), a depth direction of the receiving groove (11) being parallel to a thickness direction of the transparent cover plate (10), the receiving groove (11) being opened toward the first avoidance groove (241) on the second substrate; and a fingerprint unlocking unit (40) disposed on a bottom of the receiving groove (11).

14 Claims, 8 Drawing Sheets

(51) Int. Cl.
*G06F 1/16* (2006.01)
*H04M 1/02* (2006.01)

(52) U.S. Cl.
CPC ...... *G06K 9/00013* (2013.01); *H04M 1/0266* (2013.01); *G06F 2203/04102* (2013.01); *G06F 2203/04103* (2013.01); *H04M 1/0279* (2013.01)

(58) Field of Classification Search
CPC ...... G06F 3/0416; G06F 1/1626; H04M 1/02; H04M 1/0266; H04M 1/0279
See application file for complete search history.

(56) References Cited

U.S. PATENT DOCUMENTS

| | | | |
|---|---|---|---|
| 2009/0268130 A1* | 10/2009 | Yeh | G02F 1/1339 349/73 |
| 2014/0104185 A1* | 4/2014 | Hu | G06F 3/041 345/173 |
| 2017/0024602 A1* | 1/2017 | Han | G06K 9/00013 |
| 2017/0061193 A1* | 3/2017 | Young | G06K 9/00013 |
| 2017/0372123 A1* | 12/2017 | Kim | G06F 3/0412 |
| 2018/0052554 A1* | 2/2018 | Zhang | G06F 3/0412 |

FOREIGN PATENT DOCUMENTS

| | | |
|---|---|---|
| CN | 105872137 A | 8/2016 |
| CN | 205983398 U | 2/2017 |
| CN | 106817451 A | 6/2017 |
| KR | 10-2016-0072865 | 6/2016 |
| WO | WO-2016/093669 A1 | 6/2016 |

OTHER PUBLICATIONS

International Search Report and Written Opinion for International App. No. PCT/CN2017/102769, dated Dec. 8, 2017.

* cited by examiner

MOBILE TERMINAL TOUCH CONTROL DISPLAY STRUCTURE AND MANUFACTURING METHOD THEREOF, MOBILE TERMINAL

CROSS REFERENCE TO RELATED APPLICATIONS

This application is a U.S. National Stage under 35 U.S.C. § 371 of PCT/CN2017/102769, filed on Sep. 21, 2017, which claims priority to and the benefit of Chinese Patent Application No. 201710100544.9, filed on Feb. 23, 2017, the disclosure of which is incorporated herein in its entirety by reference.

TECHNICAL FIELD

The present disclosure relates to a mobile terminal touch control display structure and a manufacturing method thereof, and a mobile terminal.

BACKGROUND

As an electronic product, mobile terminals (such as mobile phones, tablet computers, etc.) play a more and more significant role and get obvious advantages in our daily life. With the development of mobile terminals, there are more and more requirements for the functions of mobile terminals. For example, a fingerprint unlocking unit may be provided on the mobile terminal for unlocking the mobile terminal by recognizing the user's fingerprint, thus switching the mobile terminal from a standby state to a operating state.

SUMMARY

One object of the present disclosure is to provide a mobile terminal touch control display structure and a manufacturing method thereof, and a mobile terminal.

The present disclosure provides the following technical solutions.

In a first aspect of the present disclosure, a mobile terminal touch control display structure is provided, comprising:

a touch control display panel, a display region of the touch control display panel having an inwardly recessed irregular-shaped avoidance region at an edge corresponding to a bottom of a mobile terminal, the touch control display panel comprising a first substrate and a second substrate attached with each other, wherein the second substrate is disposed close to a front panel of the mobile terminal, the second substrate having a first inwardly recessed avoidance groove at an edge corresponding to the irregular-shaped avoidance region; a transparent cover plate positioned on a side of the second substrate away from the first substrate, wherein the transparent cover plate is provided with a receiving groove in a region corresponding to the first avoidance groove, a depth direction of the receiving groove being parallel to a thickness direction of the transparent cover plate, the receiving groove being opened toward the first avoidance groove on the second substrate; and a fingerprint unlocking unit disposed on a bottom of the receiving groove.

In a second aspect of the present disclosure, a mobile terminal is provided, in which the mobile terminal touch control display structure as described in the above technical solution is provided.

In a third aspect of the present disclosure, a method for manufacturing a mobile terminal touch control display structure is provided, which is used for manufacturing the mobile terminal touch control display structure as described in the above technical solution, the method for manufacturing the mobile terminal touch control display structure comprising:

providing a touch control display panel, a display region of the touch control display panel having an inwardly recessed irregular-shaped avoidance region at an edge corresponding to a bottom of a mobile terminal, the touch control display panel comprising a first substrate and a second substrate attached with each other, wherein the second substrate is disposed close to a front panel of the mobile terminal, the second substrate having a first avoidance groove corresponding to the irregular-shaped avoidance region;

providing a transparent cover plate positioned on a side of the second substrate away from the first substrate, wherein the transparent cover plate is provided with a receiving groove in a region corresponding to the first avoidance groove, a depth direction of the receiving groove being parallel to a thickness direction of the transparent cover plate, the receiving groove being opened toward the first avoidance groove on the second substrate;

mounting a fingerprint unlocking unit on a bottom of the receiving groove; and assembling the transparent cover plate on which the fingerprint unlocking unit has been mounted to the touch control display panel.

DESCRIPTION OF THE DRAWINGS

The accompanying drawings, which are included to provide a further understanding of the disclosure and are incorporated in and constitute a part of this specification, illustrate embodiments of the disclosure, and together with the illustrative embodiments of the present disclosure serve to explain the present disclosure, but are not limitation thereof. In the drawings.

DETAILED DESCRIPTION

In order to further explain the mobile terminal touch control display structure and the manufacturing method thereof and the mobile terminal provided by an embodiment of the present disclosure, a detailed description will be described below with reference to the drawings.

When a fingerprint unlocking unit is provided on a mobile terminal, it is generally disposed on the back of the mobile terminal. When a user needs to use the mobile terminal, he/she must pick it up to cover his/her finger on a fingerprint identification area of the fingerprint unlocking unit to unlock the mobile terminal, resulting in less convenient use of the mobile terminal. If the fingerprint unlocking unit is disposed on a front panel of the mobile terminal, it is usually necessary to divide a certain area from the front panel of the mobile terminal to dispose the fingerprint unlocking unit, for example, to divide a region spanning the width of the mobile terminal at the lower portion of the front panel of the mobile terminal. This divided area cannot be used for display, resulting in a relatively smaller display area of the mobile terminal, i.e., a smaller screen-to-body ratio of the mobile terminal.

Figure 1:
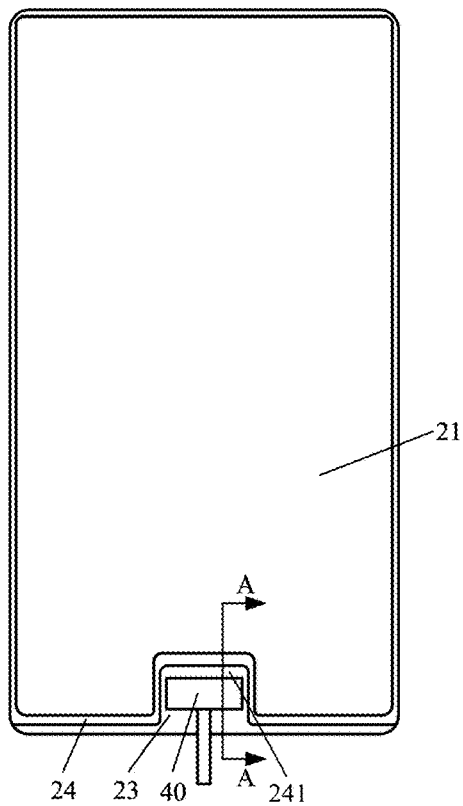
FIG. 1 is a schematic diagram of a mobile terminal touch control display structure provided by an embodiment of the present disclosure.
Figure 2:
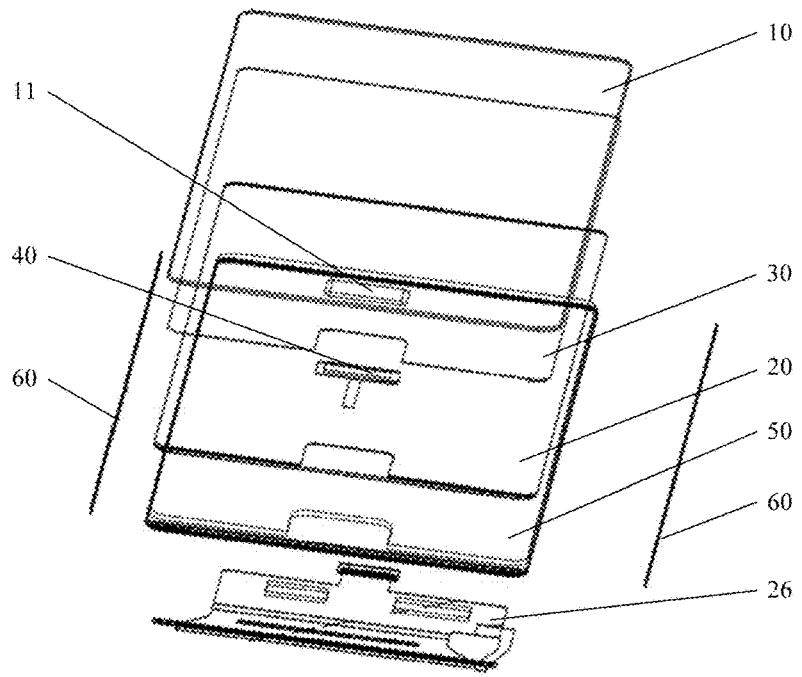
FIG. 2 is an exploded view of the mobile terminal touch control display structure in FIG. 1.
Figure 3:
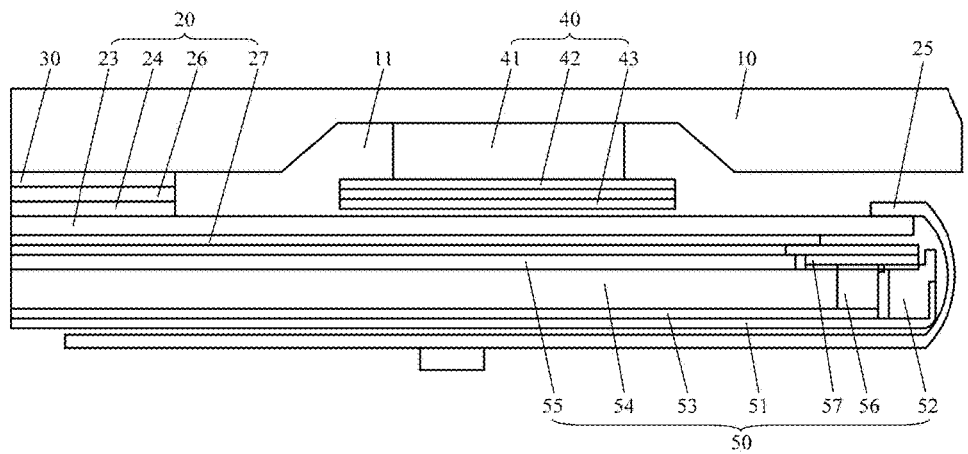
FIG. 3 is the view along the direction A-A in FIG. 1.

Refer to FIGS. 1 to 3, a mobile terminal touch control display structure provided by an embodiment of the present disclosure comprises: a touch control display panel 20, a display region 21 of the touch control display panel 20 having an inwardly recessed irregular-shaped avoidance region 22 at an edge corresponding to the bottom of a mobile terminal, the touch control display panel 20 comprising a first substrate 23 and a second substrate 24 attached with each other, wherein the second substrate 24 is disposed close to the front panel of the mobile terminal, the second substrate 24 having a first inwardly recessed avoidance groove 241 at an edge corresponding to the irregular-shaped avoidance region 22; a transparent cover plate 10 positioned on a side of the second substrate 24 away from the first substrate 23, wherein the transparent cover plate 10 is provided with a receiving groove 11 in a region corresponding to the first avoidance groove 241, a depth direction of the receiving groove 11 being parallel to a thickness direction of the transparent cover plate 10, the receiving groove 11 being opened toward the first avoidance groove 241 on the second substrate 24; and a fingerprint unlocking unit 40 disposed on the bottom of the receiving groove 11.

In the mobile terminal touch control display structure provided by the present disclosure, the fingerprint unlocking unit is disposed within a receiving groove on the transparent cover plate, and the transparent cover plate is positioned on a side of the second substrate away from the first substrate, i.e., the transparent cover plate may be considered as a front panel of the mobile terminal. When the mobile terminal is used by a user, the user only needs to cover his/her finger on a region of the transparent cover plate corresponding to the fingerprint unlocking unit to achieve the unlocking of the mobile terminal, and thereby achieve front surface unlocking of the mobile terminal. Compared with the prior art in which the fingerprint unlocking unit is provided on the back surface of a mobile terminal, the mobile terminal can be unlocked without the need of picking up the mobile terminal, leading to the improved convenience of use of the mobile terminal. Meanwhile, in the mobile terminal touch control display panel provided by the present disclosure, the display region of the touch control display panel has an inwardly recessed irregular-shaped avoidance region at an edge corresponding to the bottom of the mobile terminal, which is used to avoid the fingerprint unlocking unit. When the mobile terminal touch control display panel provided by the present disclosure is installed in a mobile terminal, it is not necessary to additionally divide a region spanning the width of the mobile terminal at the lower portion of the front panel of the mobile terminal to dispose the fingerprint unlocking unit. The region at both sides of the irregular-shaped avoidance region on the touch control display panel can be used for normal display, thereby the screen-to-body ratio of the mobile terminal can be increased.

It should be pointed out that the mobile terminal may be a mobile phone, a tablet computer, etc. The mobile terminal touch control display structure as described above may be applied to a mobile terminal such as a mobile phone or a tablet PC. In an embodiment of the present disclosure, a description will be given with an example in which the mobile terminal touch control display structure is applied to a mobile phone.

For example, the mobile terminal touch control display structure provided by the embodiment of the present disclosure is applied to a mobile phone and includes a touch control display panel 20, a transparent cover plate 10 and a fingerprint unlocking unit 40. The touch control display panel 20 may be a liquid crystal touch control display panel 20. The touch control display panel 20 has a display region 21. The display region 21 has a notch that is recessed to the inside of the display region 21 at an edge corresponding to the bottom of the mobile phone. This notch is an irregular-shaped avoidance region 22, that is, the display region 21 of the touch control display panel 20 is in an irregular shape rather than a rectangular shape. Both sides of the irregular-shaped avoidance region 22 still can be used for display. The touch control display panel 20 can be considered as an irregular-shaped touch control display panel 20. The touch control display panel 20 includes a first substrate 23 and a second substrate 24 attached with each other. The first substrate 23 may be an array substrate, and the second substrate 24 may be a color film substrate. The second substrate 24 is adjacent to the front panel of the mobile phone relative to the first substrate 23. The second substrate 24 has a first avoidance groove 241 corresponding to the irregular-shaped avoidance region 22. The first avoidance groove 241 penetrates the second substrate 24 in its thickness direction. The transparent cover plate 10 is positioned on a side of the second substrate 24 away from the first substrate 23. The transparent cover plate 10 covers a surface of the second substrate 24 away from the first substrate 23. A surface of the transparent cover plate 10 toward the second substrate 24 is coated with ink. The transparent cover plate 10 is provided with a receiving groove 11 in a region corresponding to the first avoidance groove 241, a depth direction of the receiving groove 11 being parallel to the thickness direction of the transparent cover plate 10, and the receiving groove 11 being opened toward the first avoidance groove 241 on the second substrate 24. The fingerprint unlocking unit 40 is disposed on the bottom of the receiving groove 11 and is integrated in the mobile terminal touch control display structure.

When the above mobile terminal touch control display structure is applied to a mobile phone, the transparent cover plate 10 may be used as the front panel of the mobile phone. The fingerprint unlocking unit 40 is disposed on the bottom of the receiving groove 11 of the transparent cover plate 10. The fingerprint unlocking unit 40 is integrated in the mobile terminal touch control display structure. The display region 21 of the touch control display panel 20 is in an irregular shape. The touch control display panel 20 can be considered as an irregular shaped touch control display panel 20. The touch control display panel 20 has a position for disposing the fingerprint unlocking unit 40, and thus it is not necessary to additionally provide a position on the front panel of the mobile phone to dispose the fingerprint unlocking unit 40.

When a user needs to unlock the mobile phone, the user only needs to cover his/her finger on an area of the front panel of the mobile phone corresponding to the fingerprint unlocking unit 40 to unlock the mobile phone, without picking up the mobile phone for unlocking.

As can be seen from the above, in the mobile terminal touch control display structure provided by the embodiment of the present disclosure, the fingerprint unlocking unit 40 is disposed within a receiving groove 11 on the transparent cover plate 10, and the transparent cover plate 10 is positioned on a side of the second substrate 24 away from the first substrate 23, i.e., the transparent cover plate may be considered as a front panel of the mobile terminal. When the mobile terminal is used by a user, the user only needs to cover his/her finger on a region of the transparent cover plate 10 corresponding to the fingerprint unlocking unit 40 to unlock the mobile terminal, and thereby achieve front surface unlocking of the mobile terminal. Compared with the prior art in which the fingerprint unlocking unit 40 is provided on the back surface of a mobile terminal, the mobile terminal can be unlocked without the need of picking up the mobile terminal, leading to improved convenience of use of the mobile terminal. Meanwhile, in the mobile terminal touch control display panel provided by the present disclosure, the display region 21 of the touch control display panel 20 has an inwardly recessed irregular-shaped avoidance region 22 at an edge corresponding to the bottom of the mobile terminal, which is used to avoid the fingerprint unlocking unit 40. When the mobile terminal touch control display panel provided by the embodiment of the present disclosure is installed in a mobile terminal, it is not necessary to additionally divide a region spanning the width of the mobile terminal at the lower portion of the front panel of the mobile terminal to dispose the fingerprint unlocking unit 40. The region at both sides of the irregular-shaped avoidance region 22 on the touch control display panel 20 can be used for normal display, thereby the screen-to-body ratio of the mobile terminal can be increased.

Refer to FIGS. 4 to 7, in the mobile terminal touch control display structure provided by the embodiment of the present disclosure, transitions between a side surface of the touch control display panel 20 corresponding to the top of the mobile terminal and the side surfaces of the touch control display panel 20 corresponding to both sides of the mobile terminal are curved-surface transitions; transitions between a side surface of the touch control display panel 20 corresponding to the bottom of the mobile terminal and the side surfaces of the touch control display panel 20 corresponding to both sides of the mobile terminal are curved-surface transitions. The transition between a side of the display region 21 corresponding to the top of the mobile terminal and a side of the display region 21 corresponding to a side of the mobile terminal is a curved transition; and the transition between a side of the display region 21 corresponding to the bottom of the mobile terminal and a side of the display region 21 corresponding to a side of the mobile terminal is a curved transition.

Figure 4:
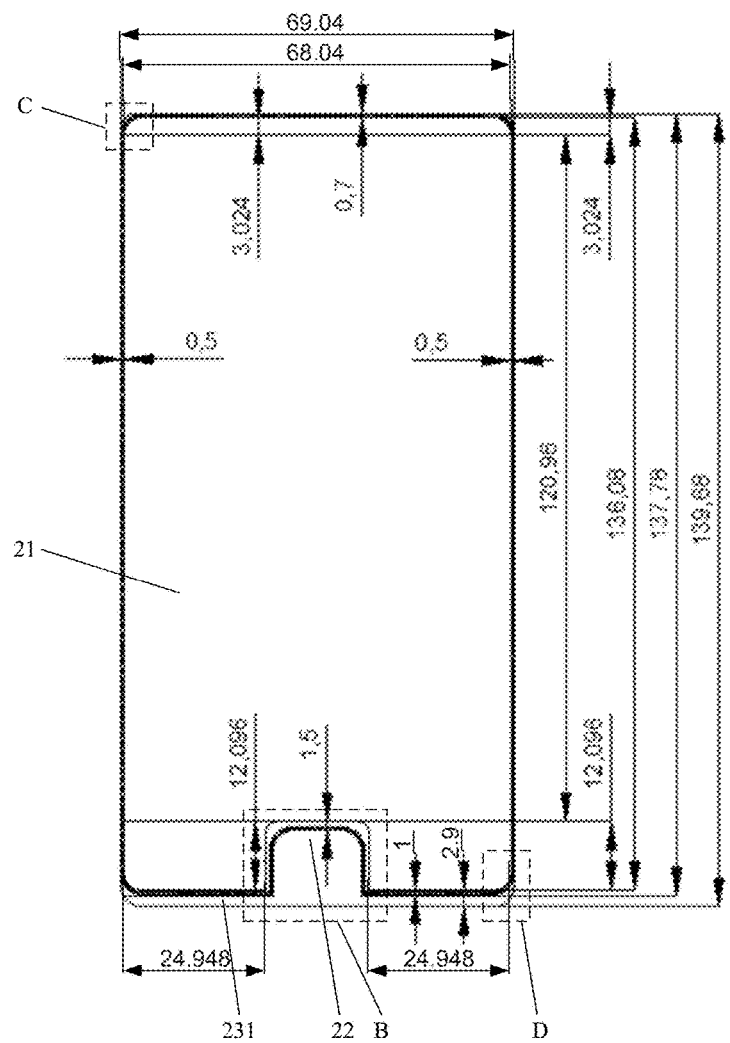
FIG. 4 is a schematic diagram of the touch control display panel in FIG. 1.
Figure 6:
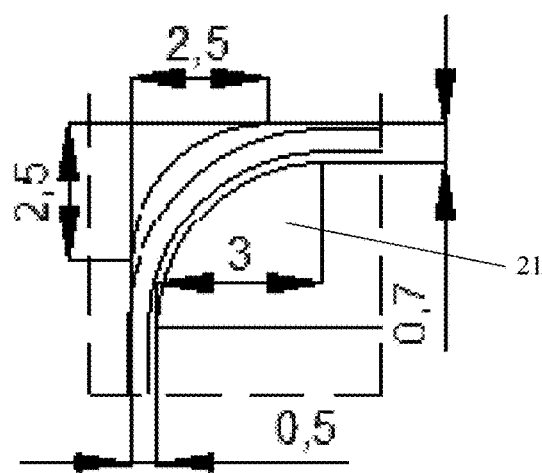
FIG. 6 is an enlarged view of area C in FIG. 4.
Figure 7:
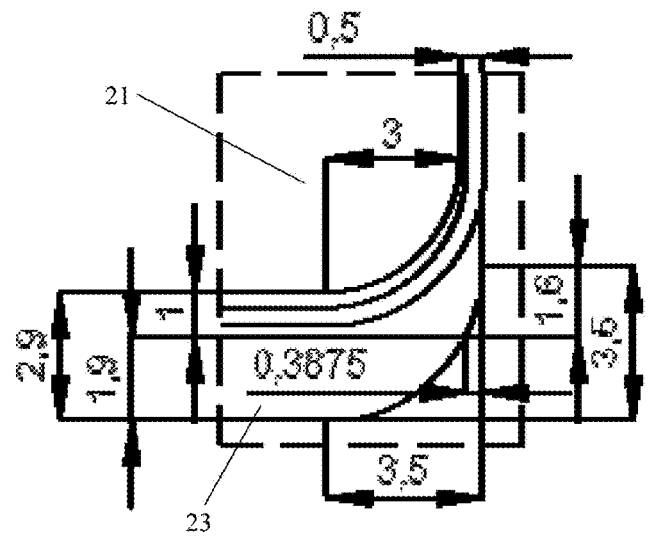
FIG. 7 is an enlarged view of area D in FIG. 4.

Particularly, the mobile terminal touch control display structure of the embodiment of the present disclosure is applied to a mobile phone. Continuing reference to FIG. 4, it is assumed that the upper side of FIG. 4 corresponds to the top of the mobile phone, and the lower side of FIG. 4 corresponds to the bottom of the mobile phone, the left and right sides of FIG. 4 respectively correspond to both sides of the mobile phone, in the mobile terminal touch control display structure provided by the embodiment of the present disclosure, a transition between the upper side surface of the touch control display panel 20 in FIG. 4 and the left side surface of the touch control display panel 20 in FIG. 4 is a curved-surface transmission, as shown in FIG. 6, for example. A transition between the upper side surface of the touch control display panel 20 in FIG. 4 and the right side surface of the touch control display panel 20 in FIG. 4 is a curved-surface transition, for example, a structure similar to that as shown in FIG. 6 can be used. A transition between the lower side surface of the touch control display panel 20 in FIG. 4 and the right side surface of the touch control display panel 20 in FIG. 4 is a curved-surface transition, as shown in FIG. 7, for example. A transition between the lower side surface of the touch control display panel 20 in FIG. 4 and the left side surface of the touch control display panel 20 in FIG. 4 is a curved-surface transition, for example, a structure similar to that as shown in FIG. 7 can be used. That is, in the mobile terminal display structure provided by the embodiment of the present disclosure, a curved-surface transition occurs at each corner of the touch control display panel 20.

In the mobile terminal display structure provided by the embodiment of the present disclosure, a transition between the upper side of the display region 21 of the touch control display panel 20 in FIG. 4 and the left side of the display region 21 of the touch control display panel 20 in FIG. 4 is the curved transition, that is, the angle between the upper side of the display region 21 of the touch control display panel 20 in FIG. 4 and the left side of the display region 21 of the touch control display panel 20 in FIG. 4 is rounded, as shown in FIG. 6, for example. A transition between the upper side of the display region 21 of the touch control display panel 20 in FIG. 4 and the right side of the display region 21 of the touch control display panel 20 in FIG. 4 is the curved transition, that is, the angle between the upper side of the display region 21 of the touch control display panel 20 in FIG. 4 and the right side of the display region 21 of the touch control display panel 20 in FIG. 4 is rounded, for example, a structure similar to that as shown in FIG. 6 can be used. A transition between the lower side of the display region 21 of the touch control display panel 20 in FIG. 4 and the right side of the display region 21 of the touch control display panel 20 in FIG. 4 is the curved transition, that is, the angle between the lower side of the display region 21 of the touch control display panel 20 in FIG. 4 and the right side of the display region 21 of the touch control display panel 20 in FIG. 4 is rounded, as shown in FIG. 7, for example. A transition between the lower side of the display region 21 of the touch control display panel 20 in FIG. 4 and the left side of the display region 21 of the touch control display panel 20 in FIG. 4 is the curved transition, that is, the angle between the lower side of the display region 21 of the touch control display panel 20 in FIG. 4 and the left side of the display region 21 of the touch control display panel 20 in FIG. 4 is rounded, for example, a structure similar to that as shown in FIG. 7 can be used. In other words, a curved-transition may occur at each corner of the display region 21 of the touch control display panel 20.

It should be noted that in the mobile terminal touch control display structure provided by the embodiment of the present disclosure, the touch control display panel 20 may be a liquid crystal touch control display panel 20 including a first substrate 23 and a second substrate 24 attached with each other, a sealant being disposed between the first substrate 23 and the second substrate 24, the first substrate 23 and the second substrate 24 being fixedly connected by the sealant, the sealant surrounding the display region 21 of the touch control display panel 20, each corner of the inner surface of the sealant being rounded, and each corner of the outer surface of the sealant being rounded as well.

The corners of the touch control display panel 20 are all curved-surface transitions, and the corners of the display region 21 are all curved transitions, and thus the touch control display panel 20 can be matched with the housing 70 of the mobile terminal. Compared with the prior art in which the display region 21 of the touch control display panel 20 is rectangular, the screen-to-body ratio of the mobile terminal can be further improved.

Moreover, the corners of the touch control display panel 20 are all curved-surface transitions, and the corners of the display region 21 are all curved transitions, and thus the touch control display panel 20 can be matched with the housing 70 of the mobile terminal. The mobile terminal provided with the mobile terminal touch control display structure provided by the embodiment of the present disclosure may be a full-screen display mobile terminal.

Continuing to refer to FIGS. 2 and 3, in the embodiment of the present disclosure, a surface of the first substrate 23 toward the second substrate 24 has a bonding region 231 at an edge corresponding to the bottom of the mobile terminal. The bonding region 231 is bonded to a flexible circuit board 25 on which a touch control display chip is disposed. A portion of the flexible circuit board 25 on which the touch control display chip is disposed is bent to the side of the first substrate 23 away from the second substrate 24. The touch control display chip is disposed on the flexible circuit board 25 using a COF (Chip on Flex/Film) method. In this way, compared with the prior art in which the touch control display chip is directly disposed on the first substrate 23, the area covered by the non-display region 21 on the first substrate 23 can be reduced to facilitate the narrow bezel design of the mobile terminal, and further increase the screen-to-body ratio of the mobile terminal.

Figure 8:
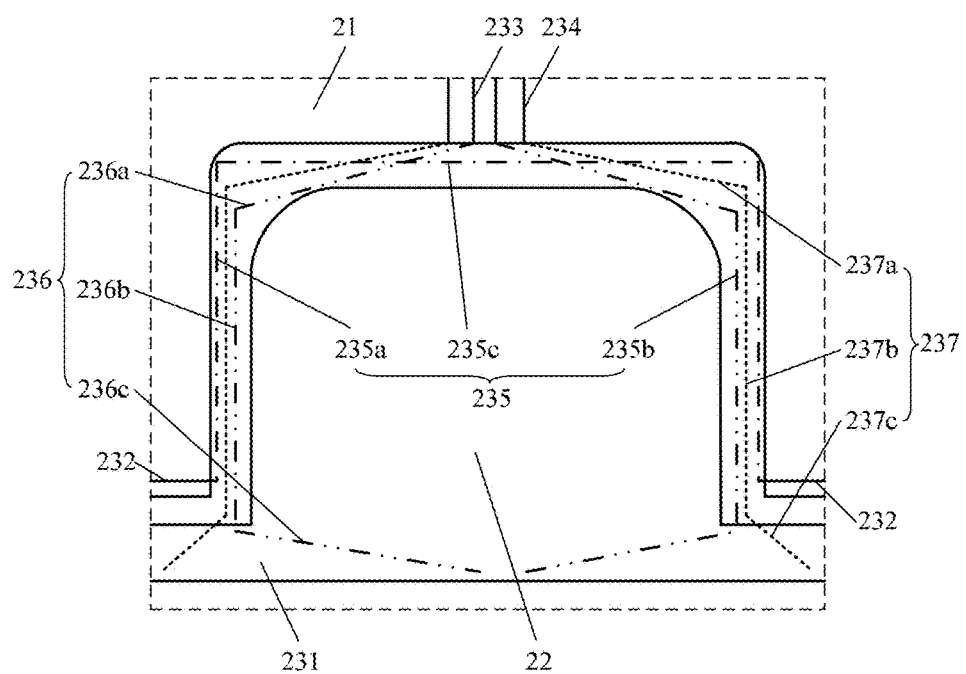
FIG. 8 is a schematic view of wiring in area B in FIG. 4.

Refer to FIG. 8, in the embodiment of the present disclosure, the first substrate 23 has a plurality of scan lines 232, a plurality of data lines 233, and a plurality of touch control lines 234 in a region corresponding to the display region 21. The scan lines 232 are perpendicular to the depth direction of the first avoidance groove 241. Both the data lines 233 and the touch control lines 234 are parallel to the depth direction of the first avoidance groove 241. The data lines 233 and the touch control lines 234 are disposed in the same layer. The first substrate 23 has an irregular-shaped periphery region located between the display region 21 and the irregular-shaped avoidance region 22. Scan connection lines 235, data connection lines 236, and touch control connection lines 237 are provided in the irregular-shaped periphery region, wherein one end of the scan connection lines 235 is correspondingly connected to the scan lines 232 located on one side of the irregular-shaped avoidance region 22, the other end of the scan connection lines 235 is correspondingly connected to the scan lines 232 located on another side of the irregular-shaped avoidance region. One end of the data connection lines 236 is correspondingly connected to the data lines 233 extending to the irregular-shaped periphery region, and the other end of the data connection lines 236 extends into the bonding region 231; one end of the touch control connection lines 237 is correspondingly connected to the touch control lines 234 extending to the irregular-shaped periphery region, and the other end of the touch control connection lines 237 extends into the bonding region 231.

Particularly, continuing reference to FIG. 4, there is an irregular-shaped periphery region between the irregular-shaped avoidance region 22 and the display region 21. This irregular-shaped periphery region can be considered as a packaging region corresponding to the irregular-shaped avoidance region 22. Due to the presence of the irregular-shaped avoidance region 22, the portion of the display region 21 corresponding to the bottom portion of the mobile terminal is divided into two portions located on both sides of the irregular-shaped avoidance region 22 respectively. Scan connection lines 235 are provided in the irregular-shaped periphery region, one end of the scan connection lines being correspondingly connected to the scan lines 232 located on one side of the irregular-shaped avoidance region 22, and the other end of the scan connection lines 235 being correspondingly connected to the scan lines 232 located on another side of the irregular-shaped avoidance region 22. That is, the scan lines 232 on both sides of the irregular-shaped avoidance region 22 are correspondingly connected to each other by the corresponding scan connection lines 235. Thus, the scan lines 232 located in the same line and on both sides of the irregular-shaped avoidance region 22 can be driven by one driving unit, without the need of providing separate driving units respectively. Thus, the structure of the touch control display panel 20 can be simplified. At the same time, the scan connection lines 235 are located in the irregular-shaped periphery region to avoid the irregular-shaped avoidance region 22, thereby preventing the scan connection lines 235 from being adversely affected when the second substrate 24 is cut to obtain the first avoidance groove 241.

The data connection lines 236 and the touch control connection lines 237 are further disposed in the irregular-shaped periphery region. The data lines 236 extending to the irregular-shaped periphery region are connected to the bonding region 231 by the data connection lines 236. The touch control lines 237 extending to the irregular-shaped periphery region are connected to the bonding region 231 by the data connection lines 237. Both of the data connection lines 236 and the touch control connection lines 237 avoid the irregular-shaped avoidance region 22, thereby preventing the data connection lines 236 and the touch control connection lines 237 from being adversely affected when the second substrate 24 is cut to obtain the first avoidance groove 241.

In order to reduce the area occupied by the scan connection lines 235 in the irregular-shaped periphery region, continuing reference to FIG. 8, each of the scan connection lines 235 comprises a first scan connection segment 235*a* located in an area within the irregular-shaped periphery region corresponding to one groove side wall of the first avoidance groove 241, a second scan connection segment 235*b* located in an area within the irregular-shaped periphery region corresponding to another groove side wall of the first avoidance groove 241, and a third scan connection segment 235*c* located in an area within the irregular-shaped periphery region corresponding to the bottom of the first avoidance groove 241. A portion of the first scan connection segment 235*a* in the irregular-shaped periphery region is disposed in the same layer as the scan lines 232, and the remaining portion of the first scan connection segment 235*a* is disposed in the same layer as the data lines 233. A portion of the second scan connection segment 235*b* in the irregular-shaped periphery region is disposed in the same layer as the scan lines 232, and the remaining portion of the second scan connection segment 235*b* is disposed in the same layer as the data lines 233. The third scan connection segment 235*c* is disposed in the same layer as the data lines 233.

Similarly, in order to reduce the area occupied by the data connection lines 236 in the irregular-shaped periphery region, continuing reference to FIG. 8, each of the data connection lines 236 comprises a first data connection segment 236*a* located in an area within the irregular-shaped periphery region corresponding to the bottom of the first avoidance groove 241, a second data connection segment 236b located in an area within the irregular-shaped periphery region corresponding to a groove side wall of the first avoidance groove 241, and a third data connection segment 236c extending into the bonding region 231. The first data connection segment 236a is disposed in the same layer as the scan lines 232. A portion of the second data connection segment 236b within the irregular-shaped periphery region is disposed in the same layer as the scan lines 232, and the remaining portion of the second data connection segment 236b is disposed in the same layer as the data lines 233. The third data connection segment 236c is disposed in the same layer as the data lines 233.

In order to reduce the area occupied by the touch control connection line 236 in the irregular-shaped periphery region, continuing reference to FIG. 8, each of the touch control connection lines 236 comprises a first touch control connection segment 237a located in an area within the irregular-shaped periphery region corresponding to the bottom of the first avoidance groove 241, a second touch control connection segment 237b located in an area within the irregular-shaped periphery region corresponding to a groove side wall of the first avoidance groove 241, and a third touch control connection segment 237c extending into the bonding region 231. The first touch control connection segment 237a is disposed in the same layer as the scan lines 232. A portion of the second touch control connection segment 237b within the irregular-shaped periphery region is disposed in the same layer as the scan lines 232, and the remaining portion of the second touch control connection segment 237b is disposed in the same layer as the data lines 233. The third touch control connection segment 237c is disposed in the same layer as the scan lines 232.

In order to prevent mutual interference between the scan connection lines 235, the data connection lines 236 and the touch control connection lines 237, continuing the reference to FIG. 8. the irregular-shaped periphery region includes a scan connection wiring region where the scan connection lines 235 are disposed, a data connection wiring region where the data connection lines 236 are disposed, and a touch control connection wiring region where the touch control connection lines 237 are disposed. The scan connection wiring region is close to the display region 21 of the mobile terminal touch control display structure, the data connection wiring region is away from the display region 21 of the mobile terminal touch control display structure, and the touch control connection wiring region is located between the scan connection wiring region and the data connection wiring region.

Figure 9:
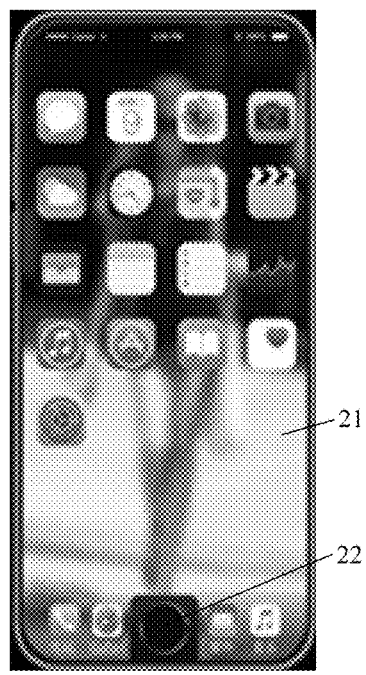
FIG. 9 is a schematic diagram of the mobile terminal which is in operation provided by the embodiment of the present disclosure.
Figure 10:
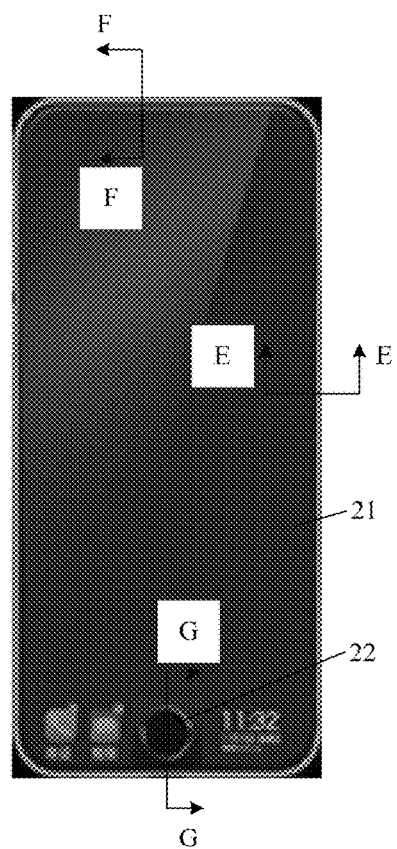
FIG. 10 is a schematic diagram of the mobile terminal which is in a standby state provided by the embodiment of the present disclosure.

In the embodiment of the present disclosure, the touch control display panel 20 further includes a first array substrate row driving circuit and a second array substrate row driving circuit. Both of the first array substrate row driving circuit and the second array substrate row driving circuit are located on the first substrate 23 at edges corresponding to both sides of the mobile terminal. For example, the first array substrate row driving circuit and the second array substrate row driving circuit may be disposed in the packaging region of the first substrate 23 corresponding to both sides of the mobile terminal. The first array substrate row driving circuit is used to provide a scan driving signal for the scan lines 232 located on both sides of the irregular-shaped avoidance region 22, and the second array substrate row driving circuit is used to provide a scan driving signal for the remaining scan lines 232. The scan lines 232 are driven using Gate Driver on Array (GOA) technology, and different array substrate row driving circuits are used to drive the scan lines 232 located on both sides of the irregular-shaped avoidance region 22 and the remaining scan lines 232. That is, the display of the portion of the display region 21 located on both sides of the irregular-shaped avoidance region 22 is controlled separately from the display of the other portion of the display region 21, so that partitioned display can be achieved on the touch control display panel 20. For example, referring to FIG. 9, in a case of applying the mobile terminal touch control display structure provided by the embodiment of the present disclosure into a mobile phone, when the mobile phone is in operation, the display region 21 is displayed in full screen. Referring to FIG. 10, when the mobile phone is in standby, the portion of the display region 21 located on both sides of the irregular-shaped avoidance region 22 can display, for example, time, call records, etc. At this time, no full-screen display is performed on the display region 21, so that electric energy can be saved.

Continuing reference to FIG. 3, in the embodiment of the present disclosure, the fingerprint unlocking unit 40 may include an unlocking circuit board 42 and an unlocking driving chip 41 located on the unlocking circuit board 42. The unlocking driving chip 41 is disposed on the bottom of the receiving groove 11. The unlocking driving chip 41 can be adhered to the bottom of the receiving groove 11 by the thermosetting adhesive. A reinforcing plate 43 is provided on a side of the unlocking circuit board 42 away from the unlocking driving chip 41. The unlocking circuit board 42 may be adhered to the reinforcing plate 43 using an adhesive.

Continuing reference to FIG. 3, in the mobile terminal touch control display structure provided by the embodiment of the present disclosure, the touch control display panel 20 further includes an upper polarizer 26 and a lower polarizer 27. The upper polarizer 26 is attached to a surface of the second substrate 24 away from the first substrate 23. A second avoidance groove is provided in a region of the upper polarizer 26 corresponding to the first avoidance groove 241. The upper polarizer 26 is fixedly connected to the transparent cover plate 10 by an Optically Clear Adhesive (OCA) 30. The lower polarizer 27 is attached to a surface of the first substrate 23 away from the second substrate 24.

Continuing reference to FIGS. 2 and 3, the mobile terminal touch control display structure provided by the embodiment of the present disclosure further includes a backlight module 50 located on a side of the lower polarizer 27 away from the first substrate 23. The backlight module 50 is connected to the lower polarizer 27 by an adhesive tape. The backlight module 50 is an edge-lit backlight module 50. In a light-emitting assembly of the edge-lit backlight module 50, a light emitter 56 is located on a side of the edge-lit backlight module 50 corresponding to the bottom of the mobile terminal, a light emitting circuit board 57 is bent to the back of the edge-lit backlight module 50, and a light-emitting driving chip is packaged on the light-emitting circuit board 57 using the Chip On Board (COB) packaging technology. Specifically, the backlight module 50 includes a back plate 51, a plastic frame 52, a reflection sheet 53, a light guide plate 54, an optical film 55, and a light emitting assembly. The plastic frame 52 is mounted in the back plate 51 and is attached to the inner surface of the back plate 51. The reflection sheet 53, the light guide plate 54 and the optical film 55 are sequentially stacked on the inner bottom surface of the back plate 51. The optical film 55 includes a diffusion sheet, a lower prism and an upper prism which are sequentially stacked in sequence. The diffusion sheet is located between the light guide plate 54 and the lower prism.

The light emitting assembly includes a light emitter 56 and a light emitting circuit board 57. The light emitter 56 is located on the light emitting circuit board 57. The light emitter 56 is located on a side of the light guide plate corresponding to the bottom of the mobile terminal. The light emitting circuit board 57 is bent to the back of the backlight module 50.

An embodiment of the present disclosure further provides a mobile terminal, in which the mobile terminal touch control display structure according to the above embodiment is provided.

Compared with the prior art, the mobile terminal has the same advantages as that of the mobile terminal touch control display structure described above, which will not be described in detail herein.

In order to describe the mobile terminal touch control display structure and the mobile terminal provided in the above embodiments in detail, an example will be given in which the mobile terminal is a mobile phone, and the mobile terminal touch control display structure is applied to the mobile phone. In the mobile terminal touch control display structure, in terms of thickness of the mobile terminal touch control display structure, the thickness of the transparent cover plate may be 0.7 mm, the thickness of the optically clear adhesive 30 may be 0.15 mm, the thickness of the touch control display panel 20 may be 0.495 mm (wherein the thickness of the upper polarizer 26 may be 0.087 mm, the thickness of the second substrate 24 may be 0.15 mm, the thickness of the first substrate 23 may be 0.15 mm, and the thickness of the lower polarizer 27 may be 0.108 mm), the thickness of the backlight module 50 may be 0.637 mm (wherein the total thickness of the upper and lower prisms may be 0.082 mm, the thickness of the diffusion sheet may be 0.053 mm, the thickness of the light guide plate 54 may be 0.32 mm, the thickness of the reflection sheet 53 may be 0.082 mm, the thickness of the backplane 51 may be 0.1 mm), the thickness of the adhesive tape between the backlight module 50 and the lower polarizer 27 is 0.05 mm, and there is a gap of 0.018 mm between the upper prism and the lower polarizer 27 in the backlight module 50, so that the thickness of the mobile terminal touch control display structure may be 2.05 mm, which may have a tolerance of ±0.2 mm. In the mobile terminal touch control display structure, the thickness between the bottom of the receiving groove 11 and the first substrate 23 may be 1.087 mm (wherein, the thickness of the unlocking driving chip 41 may be 0.25 mm, the thickness of the unlocking circuit board 42 may be 0.15 mm, the thickness of the reinforcing plate 43 may be 0.2 mm, a distance between the fingerprints driving chip and the bottom of the receiving groove 11 is 0.3 mm, which includes the thickness of the ink coated on the bottom of the receiving groove 11 and the thickness of the thermosetting adhesive for adhering the fingerprint driving chip, the thickness of the adhesive between the unlocking circuit board 42 and the reinforcing plate 43 may be 0.05 mm, and there is a gap of 0.137 mm between the reinforcing plate 43 and the first substrate 23).

Figure 5:
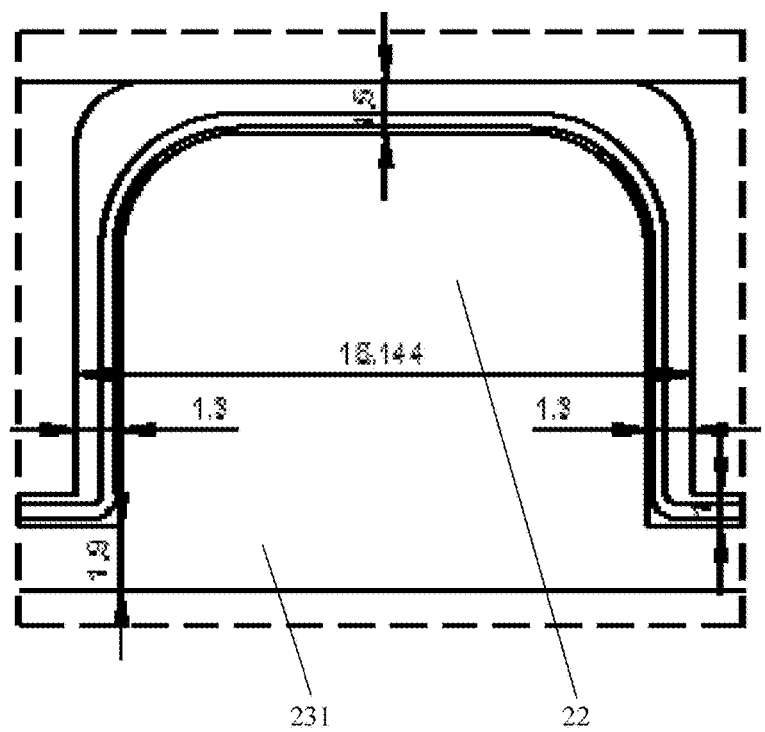
FIG. 5 is an enlarged view of area B in FIG. 4.

In terms of the planar sizes of the mobile terminal touch control display structure, the touch display panel 20 includes a first substrate 23 and a second substrate 24, referring to FIG. 4, the length of the first substrate 23 is 139.68 mm, the width of the first substrate 23 is 69.04 mm, the length of the second substrate 24 is 137.78 mm, the width of the second substrate 24 is 69.04 mm, the upper surface of the first substrate 23 is flush with the upper surface of the second substrate 24, the portion of the first substrate 23 that is longer than the second substrate 24 is the bonding region 231, the width of the bonding region 231 is 1.9 mm, the length of the display region 21 of the touch display panel 20 is 136.08 mm, the width of the display region 21 is 68.04 mm, the irregular-shaped avoidance region 22 is located in the middle of the lower side of the display region 21 in FIG. 4, and the width of a region of the display region 21 located on the left side of the irregular-shaped avoidance region is 24.948 mm, the width of a region of the display region 21 located on the right side of the irregular-shaped avoidance region is 24.948 mm, the length of the region of the display region 21 corresponding to the irregular-shaped avoidance region 22 is 12.096 mm, on the left side in FIG. 4, the width of the packaging region is 0.5 mm, on the right side in FIG. 4, the width of the packaging region is 0.5 mm, the first array substrate row driving circuit is located in the package region on the left side in FIG. 4 or/and the right side in FIG. 4, the second array substrate row driving circuit is located in the package region on the left side in FIG. 4 or/and the right side in FIG. 4, on the upper side in FIG. 4, the width of the packaging region is 0.7 mm, on the lower side in FIG. 4, the width of the packaging region is 1 mm; in the display area 21, in the left-right direction in FIG. 4, the display region 21 includes 1080 columns of pixels, each pixel including three sub-pixels, and the pitch between two adjacent columns of pixels in the left-right direction in FIG. 4 is 21 μm, in the up-down direction in FIG. 4, the display region 21 includes 2160 rows of pixels, and the pitch between two adjacent rows of pixels in the up-down direction in FIG. 4 is 63 μm; in the up-down direction in FIG. 4, the region of the display region 21 corresponding to the irregular-shaped avoidance region 22 includes 192 rows of pixels, and the region of the display region 21 corresponding to the irregular-shaped avoidance region 22 includes 192 scan lines 232; in the up-down direction in FIG. 4, the region of the display region 21 excluding the region corresponding to the irregular-shaped avoidance region 22 includes 1968 rows of pixels, and the region of the display region 21 excluding the region corresponding to the irregular-shaped avoidance region 22 includes 1968 scan lines 232; the 192 scan lines 232 are driven by the first array substrate row driving circuit and the 1968 scan lines 232 are driven by the second array substrate row driving circuit, the display pixel density in the display region (Pixels Per Inch (PPI)) is 403.

as shown in FIG. 5, the depth of the first avoidance groove 241 on the second substrate 24 is 11.596 mm, the width of the first avoidance groove 241 is 15.544 mm; in the up-down direction in FIG. 5, the distance between the display region 21 and the bottom of the first avoidance groove 241 is 1.5 mm; in the left-right direction in FIG. 5, the distance between the display region 21 and the wall of the first avoidance groove 241 is 1.3 mm, i.e., the width of the irregular-shaped periphery region in the up-down direction in FIG. 5 is 1.5 mm, the width of the irregular-shaped periphery region in the left-right direction in FIG. 5 is 1.3 mm.

All the corners of the touch control display panel 20 are rounded, as shown in FIG. 6, the two corners located at the upper portion of the touch control display panel 20 in FIG. 4 are rounded corners with a radius of 2.5 mm. As shown in FIG. 7, the two corners located at the lower portion of the touch control display panel 20 are rounded corners with a radius of 3.5 mm.

All the corners of the display region 21 of the touch control display panel 20 are rounded, as shown in FIG. 6, the two corners located at the upper portion of the display region 21 in FIG. 4 are rounded corners with a radius of 3 mm. The region of the display region 21 corresponding to the two corners in the upper portion of FIG. 4 has a length of 3.024 mm in the up-down direction in FIG. 4. As shown in FIG. 7, the two corners located at the lower portion of the display region 21 are rounded corners with a radius of 3 mm.

Figure 11:
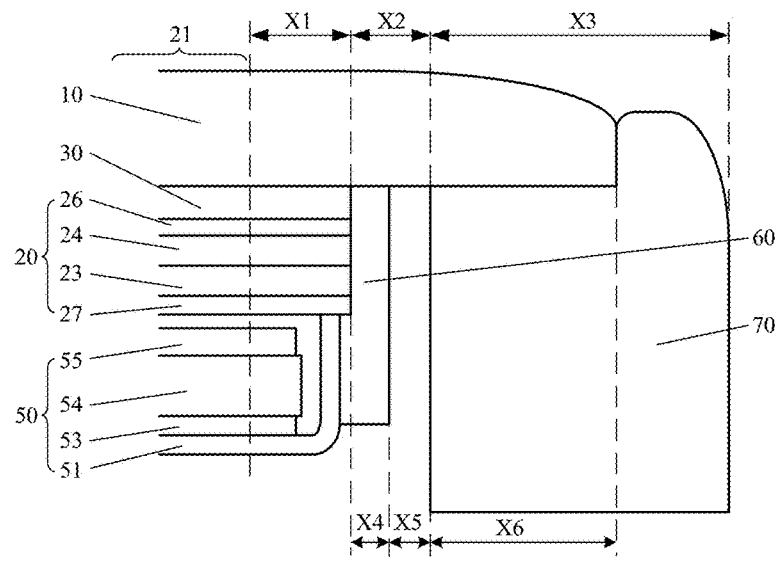
FIG. 11 is the view along the direction E-E in FIG. 10.

When the mobile terminal touch control display structure is applied to a mobile phone, as shown in FIG. 11, both sides of the mobile terminal touch control display structure in FIG. 10 are coated with the glue 60, the distance X1 between the display region 21 of the touch control display panel 20 and the right side surface of the touch control display panel 20 is 0.5 mm, the distance X2 between the right side surface of the touch control display panel 20 and the housing 70 of the mobile phone is 0.5 mm, and the thickness X3 of the housing 70 of the mobile phone is 1.6 mm, the thickness X4 of the glue 60 is 0.2 mm, the distance X5 between the glue 60 and the housing 70 is 0.3 mm, and the mating width X6 of the transparent cover plate 10 and the housing 70 is 0.8 mm. Correspondingly, the left side of the mobile phone in FIG. 10 is also designed according to the above data.

Figure 12:
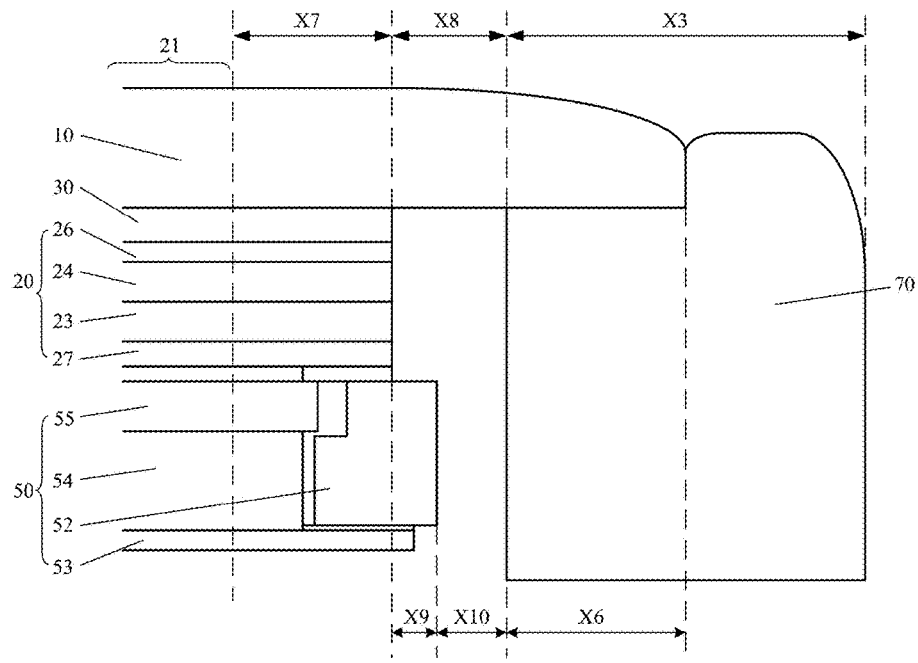
FIG. 12 is the view along the direction F-F in FIG. 10.

As shown in FIG. 12, the distance X7 between the display region 21 of the touch control display panel 20 and the upper surface of the touch control display panel 20 is 0.7 mm, and the distance X8 between the upper surface of the touch control display panel 20 and the housing 70 of the mobile phone is 0.5 mm, the distance X9 between the upper surface of the touch control display panel 20 and the upper surface of the plastic frame 52 of the backlight module 50 is 0.2 mm, and the distance X10 between the upper surface of the plastic frame 52 and the housing 70 of the mobile phone is 0.3 mm.

Figure 13:
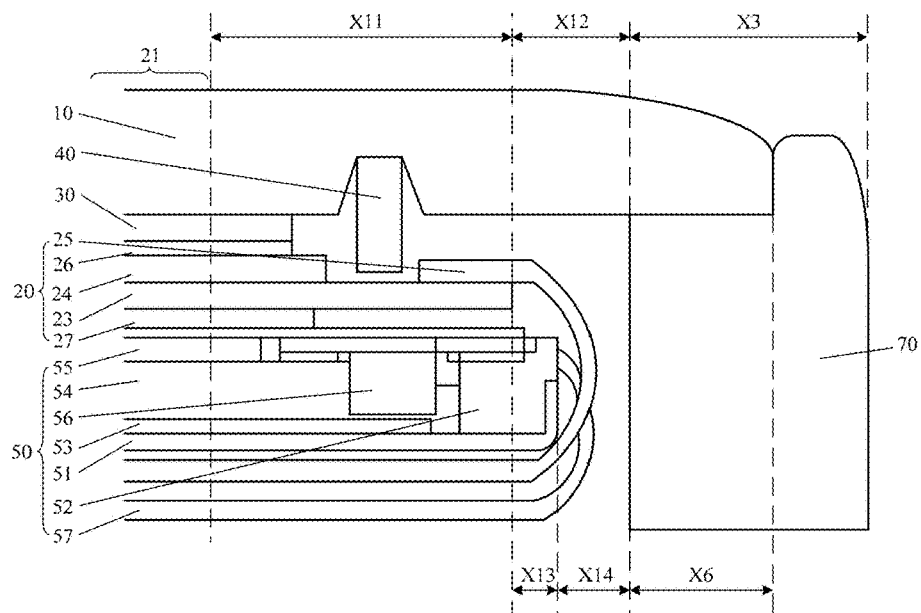
FIG. 13 is the view along the direction G-G in FIG. 10.

As shown in FIG. 13, the distance X11 between the display region 21 of the touch control display panel 20 and the lower surface of the touch control display panel 20 is 2.6 mm, and the distance X12 between the lower surface of the touch control display panel 20 and the housing 70 of the mobile phone is 1.2 mm, the distance X13 between the lower surface of the touch control display panel 20 and the lower surface of the plastic frame 52 of the backlight module 50 is 0.4 mm, and the distance X14 between the lower surface of the plastic frame 52 and the casing 70 of the mobile phone is 0.3 mm.

Figure 14:
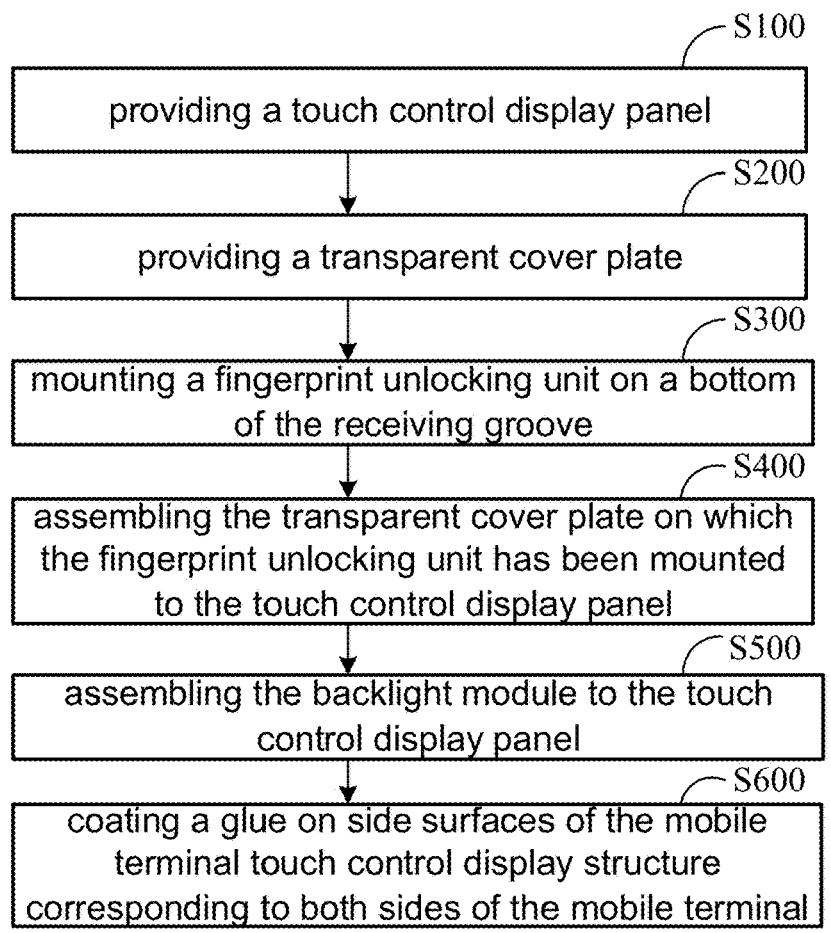
FIG. 14 is a flowchart of a method for manufacturing the mobile terminal touch control display structure provided by the embodiment of the present disclosure.

Refer to FIG. 14, an embodiment of the present disclosure further provides a method for manufacturing a mobile terminal touch control display structure, which can be used for manufacturing the mobile terminal touch control display structure of the above embodiment, the method for manufacturing the mobile terminal touch control display structure comprising:

step S100: providing a touch control display panel, a display region of the touch control display panel having an inwardly recessed irregular-shaped avoidance region at an edge corresponding to the bottom of a mobile terminal, the touch control display panel comprising a first substrate and a second substrate attached with each other, wherein the second substrate is disposed close to the front panel of the mobile terminal, and the second substrate has a first avoidance groove corresponding to the irregular-shaped avoidance region;

step S200: providing a transparent cover plate located on a side of the second substrate away from the first substrate, wherein the transparent cover plate is provided with a receiving groove in a region corresponding to the first avoidance groove, a depth direction of the receiving groove being parallel to a thickness direction of the transparent cover plate, and the receiving groove being opened toward the first avoidance groove on the second substrate;

step S300: mounting a fingerprint unlocking unit on the bottom of the receiving groove;

step S400: assembling the transparent cover plate on which the fingerprint unlocking unit has been mounted to the touch control display panel.

Compared with the prior art, the method for manufacturing the mobile terminal touch control display structure has the same advantages as that of the mobile terminal touch control display structure described above, which will not be described in detail herein.

Figure 15:
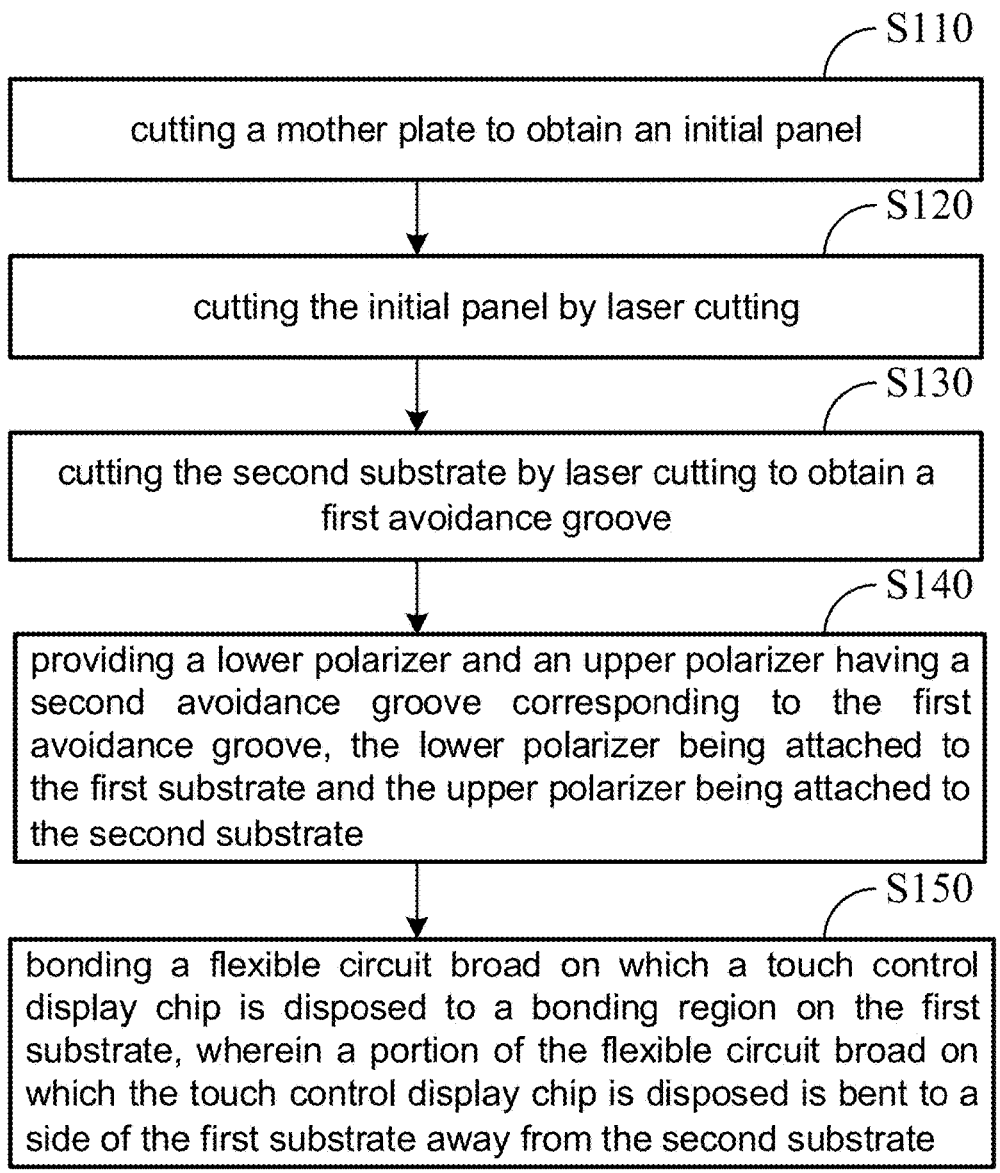
FIG. 15 is a flowchart of step S100 in FIG. 14.

Refer to FIG. 15, providing a touch control display panel in step S100 of the embodiment comprises:

step S110: cutting a mother plate to obtain an initial panel comprising a first substrate and a second substrate attached with each other, wherein a transition between a side of the display region corresponding to the top of the mobile terminal and a side of the display region corresponding to a side of the mobile terminal is a curved transition, and a transition between a side of the display region corresponding to the bottom of the mobile terminal and a side of the display region corresponding to a side of the mobile terminal is a curved transition;

step S120: cutting the initial panel by laser cutting, wherein transitions between a side surface of the cut initial panel corresponding to the top of the mobile terminal and side surfaces of the cut initial panel corresponding to both sides of the mobile terminal are curved-surface transitions, and transitions between a side surface of the cut initial panel corresponding to the bottom of the mobile terminal and side surfaces of the cut initial panel corresponding to both sides of the mobile terminal are curved-surface transitions; wherein when cutting the side surfaces of the initial panel corresponding to both sides of the mobile terminal, a cutting line falls within a sealant of the initial panel, and when cutting the side surfaces of the initial panel corresponding to the top and the bottom of the mobile terminal, the cutting line is spaced from an outer border line of the sealant by a first distance equal to or greater than 0.1 mm.

step S130: cutting the second substrate by laser cutting to obtain a first avoidance groove, wherein when cutting the second substrate to obtain the first avoidance groove, the cutting line is spaced from the outer border line of the sealant by a second distance equal to or greater than 0.1 mm.

step S140: providing a lower polarizer and an upper polarizer having a second avoidance groove corresponding to the first avoidance groove, the lower polarizer being attached to the first substrate and the upper polarizer being attached to the second substrate;

step S150: bonding a flexible circuit broad on which a touch control display chip is disposed to a bonding region on the first substrate, wherein a portion of the flexible circuit broad on which the touch control display chip is disposed is bent to a side of the first substrate away from the second substrate.

Continuing to refer to FIG. 14, the method for manufacturing a mobile terminal touch control display structure provided in the embodiment of the present disclosure further comprises:

step S400: assembling the transparent cover plate on which the fingerprint unlocking unit has been mounted to the touch control display panel.

step S500: assembling the backlight module to the touch control display panel.

step S600: coating a glue on side surfaces of the mobile terminal touch control display structure corresponding to both sides of the mobile terminal.

The particular features, structures, materials or characteristics may be combined as suitable in the description of the above embodiments.

The disclosed above are only several specific embodiments of the present disclosure, but the present disclosure is not limited thereto. Any variation or replacement easily conceivable by those skilled in the art within the technical scope disclosed in the present disclosure shall fall within the protection scope of the present disclosure. Therefore, the protection scope of the present disclosure shall be determined by the terms of the claims.

What is claimed is:

1. A mobile terminal touch control display structure, comprising:
    a touch control display panel, a display region of the touch control display panel having an inwardly recessed irregular-shaped avoidance region at an edge corresponding to a bottom of a mobile terminal, the touch control display panel comprising a first substrate and a second substrate attached with each other, wherein the second substrate is disposed close to a front panel of the mobile terminal, the second substrate having an inwardly recessed first avoidance groove at an edge corresponding to the irregular-shaped avoidance region;
    a transparent cover plate positioned on a side of the second substrate away from the first substrate, wherein the transparent cover plate is provided with a receiving groove in a region corresponding to the first avoidance groove, a depth direction of the receiving groove being parallel to a thickness direction of the transparent cover plate, the receiving groove being opened toward the first avoidance groove on the second substrate; and
    a fingerprint unlocking unit disposed on a bottom of the receiving groove,
    wherein a surface of the first substrate toward the second substrate has a bonding region at an edge corresponding to the bottom of the mobile terminal;
    the first substrate has a plurality of scan lines, a plurality of data lines, and a plurality of touch control lines in a region corresponding to the display region, wherein the scan lines are perpendicular to the depth direction of the first avoidance groove; both the data lines and the touch control lines are parallel to the depth direction of the first avoidance groove; the data lines and the touch control lines are disposed in the same layer; and
    the first substrate has an irregular-shaped periphery region located between the display region and the irregular-shaped avoidance region; scan connection lines, data connection lines, and touch control connection lines are provided in the irregular-shaped periphery region, wherein one end of the scan connection lines is correspondingly connected to the scan lines located on one side of the irregular-shaped avoidance region, another end of the scan connection lines is correspondingly connected to the scan lines located on the other side of the irregular-shaped avoidance region; one end of the data connection lines is correspondingly connected to the data lines extending to the irregular-shaped periphery region, and another end of the data connection lines extends into the bonding region; one end of the touch control connection lines is correspondingly connected to the touch control lines extending to the irregular-shaped periphery region, and another end of the touch control connection lines extends into the bonding region.

2. The mobile terminal touch control display structure according to claim 1, wherein transitions between a side surface of the touch control display panel corresponding to a top of the mobile terminal and side surfaces of the touch control display panel corresponding to both sides of the mobile terminal are curved-surface transitions, and transitions between a side surface of the touch control display panel corresponding to the bottom of the mobile terminal and the side surfaces of the touch control display panel corresponding to both sides of the mobile terminal are curved-surface transitions; and
    a transition between a side of the display region corresponding to the top of the mobile terminal and a side of the display region corresponding to a side of the mobile terminal is a curved transition, and a transition between a side of the display region corresponding to the bottom of the mobile terminal and a side of the display region corresponding to a side of the mobile terminal is a curved transition.

3. The mobile terminal touch control display structure according to claim 1, wherein the bonding region being bonded to a flexible circuit board on which a touch control display chip is disposed, a portion of the flexible circuit board on which the touch control display chip is disposed being bent to the side of the first substrate away from the second substrate.

4. The mobile terminal touch control display structure according to claim 1, wherein each of the scan connection lines comprises a first scan connection segment located in an area within the irregular-shaped periphery region corresponding to one groove side wall of the first avoidance groove, a second scan connection segment located in an area within the irregular-shaped periphery region corresponding to another groove side wall of the first avoidance groove, and a third scan connection segment located in an area within the irregular-shaped periphery region corresponding to the bottom of the first avoidance groove, wherein a portion of the first scan connection segment in the irregular-shaped periphery region is disposed in the same layer as the scan lines, and a remaining portion of the first scan connection segment is disposed in the same layer as the data lines; a portion of the second scan connection segment in the irregular-shaped periphery region is disposed in the same layer as the scan lines, and the remaining portion of the second scan connection segment is disposed in the same layer as the data lines; the third scan connection segment is disposed in the same layer as the data lines;
    each of the data connection lines comprises a first data connection segment located in an area within the irregular-shaped periphery region corresponding to the bottom of the first avoidance groove, a second data connection segment located in an area within the irregular-shaped periphery region corresponding to a groove side wall of the first avoidance groove, and a third data connection segment extending into the bonding region, wherein the first data connection segment is disposed in the same layer as the scan lines; a portion of the second data connection segment within the irregular-shaped periphery region is disposed in the same layer as the scan lines, and the remaining portion of the second data connection segment is disposed in the same layer as the data lines; the third data connection segment is disposed in the same layer as the data lines; and
    each of the touch control connection lines comprises a first touch control connection segment located in an area within the irregular-shaped periphery region corresponding to the bottom of the first avoidance groove, a second touch control connection segment located in an area within the irregular-shaped periphery region corresponding to a groove side wall of the first avoidance groove, and a third touch control connection segment extending into the bonding region, wherein the first touch control connection segment is disposed in the same layer as the scan lines; a portion of the second touch control connection segment within the irregular-shaped periphery region is disposed in the same layer as the scan lines, and a remaining portion of the second touch control connection segment is disposed in the same layer as the data lines; the third touch control connection segment is disposed in the same layer as the scan lines.

5. The mobile terminal touch control display structure according to claim 1, wherein the irregular-shaped periphery region includes a scan connection wiring region where the scan connection lines are disposed, a data connection wiring region where the data connection lines are disposed, and a touch control connection wiring region where the touch control connection lines are disposed; the scan connection wiring region is located close to the display region of the mobile terminal touch control display structure, the data connection wiring region is located away from the display region of the mobile terminal touch control display structure, and the touch control connection wiring region is located between the scan connection wiring region and the data connection wiring region.

6. The mobile terminal touch control display structure according to claim 1, wherein the touch control display panel further includes a first array substrate row driving circuit and a second array substrate row driving circuit, wherein both of the first array substrate row driving circuit and the second array substrate row driving circuit are located on the first substrate at edges corresponding to both sides of the mobile terminal; the first array substrate row driving circuit is used to provide a scan driving signal for the scan lines located on both sides of the irregular-shaped avoidance region, and the second array substrate row driving circuit is used to provide a scan driving signal for the remaining scan lines.

7. The mobile terminal touch control display structure according to claim 1, wherein the fingerprint unlocking unit comprises an unlocking circuit board and an unlocking driving chip located on the unlocking circuit board, wherein the unlocking driving chip is disposed on the bottom of the receiving groove; a reinforcing plate is provided on a side of the unlocking circuit board away from the unlocking driving chip.

8. The mobile terminal touch control display structure according to claim 1, wherein the touch control display panel further includes an upper polarizer and a lower polarizer, wherein the upper polarizer is attached to a surface of the second substrate away from the first substrate; a second avoidance groove is provided in a region of the upper polarizer corresponding to the first avoidance groove; the upper polarizer is fixedly connected to the transparent cover plate by an optically clear adhesive; the lower polarizer is attached to a surface of the first substrate away from the second substrate.

9. The mobile terminal touch control display structure according to claim 8, wherein the mobile terminal touch control display structure further comprises a backlight module located on a side of the lower polarizer away from the first substrate, and the backlight module is connected to the lower polarizer by an adhesive tape.

10. The mobile terminal touch control display structure according to claim 9, wherein the backlight module is an edge-lit backlight module, wherein in a light-emitting assembly of the edge-lit backlight module, a light emitter is located on a side of the edge-lit backlight module corresponding to the bottom of the mobile terminal, a light emitting circuit board is bent to a back of the edge-lit backlight module.

11. A mobile terminal, wherein the mobile terminal is provided with the mobile terminal touch control display structure according to claim 1.

12. A method for manufacturing a mobile terminal touch control display structure, which is used for manufacturing the mobile terminal touch control display structure according to claim 1, the method for manufacturing the mobile terminal touch control display structure comprising:
providing a touch control display panel, a display region of the touch control display panel having an inwardly recessed irregular-shaped avoidance region at an edge corresponding to a bottom of a mobile terminal, the touch control display panel comprising a first substrate and a second substrate attached with each other, wherein the second substrate is disposed close to a front panel of the mobile terminal, the second substrate having a first avoidance groove corresponding to the irregular-shaped avoidance region;
providing a transparent cover plate positioned on a side of the second substrate away from the first substrate, wherein the transparent cover plate is provided with a receiving groove in a region corresponding to the first avoidance groove, a depth direction of the receiving groove being parallel to a thickness direction of the transparent cover plate, the receiving groove being opened toward the first avoidance groove on the second substrate;
mounting a fingerprint unlocking unit on a bottom of the receiving groove; and
assembling the transparent cover plate on which the fingerprint unlocking unit has been mounted to the touch control display panel.

13. The method for manufacturing a mobile terminal touch control display structure according to claim 12, wherein the step of providing a touch control display panel comprises:
cutting a mother plate to obtain an initial panel comprising a first substrate and a second substrate attached with each other, wherein a transition between a side of the display region corresponding to a top of the mobile terminal and a side of the display region corresponding to a side of the mobile terminal is a curved transition, and a transition between a side of the display region corresponding to the bottom of the mobile terminal and a side of the display region corresponding to a side of the mobile terminal is a curved transition;
cutting the initial panel by laser cutting, wherein transitions between a side surface of the cut initial panel corresponding to the top of the mobile terminal and side surfaces of the cut initial panel corresponding to both sides of the mobile terminal are curved-surface transitions, and transitions between a side surface of the cut initial panel corresponding to the bottom of the mobile terminal and side surfaces of the cut initial panel corresponding to both sides of the mobile terminal are curved-surface transitions; wherein when cutting the side surfaces of the initial panel corresponding to both sides of the mobile terminal, a cutting line falls within a sealant of the initial panel, and when cutting the side surfaces of the initial panel corresponding to the top and the bottom of the mobile terminal, the cutting line is spaced from an outer border line of the sealant by a first distance equal to or greater than 0.1 mm;

cutting the second substrate by laser cutting to obtain a first avoidance groove, wherein when cutting the second substrate to obtain the first avoidance groove, the cutting line is spaced from the outer border line of the sealant by a second distance equal to or greater than 0.1 mm;

providing a lower polarizer and an upper polarizer having a second avoidance groove corresponding to the first avoidance groove, the lower polarizer being attached to the first substrate and the upper polarizer being attached to the second substrate; and bonding a flexible circuit broad on which a touch control display chip is disposed to a bonding region on the first substrate, wherein a portion of the flexible circuit broad on which the touch control display chip is disposed is bent to a side of the first substrate away from the second substrate.

14. The method for manufacturing a mobile terminal touch control display structure according to claim 12, wherein the method for manufacturing the mobile terminal touch control display structure further comprises: after the step of assembling the transparent cover plate on which the fingerprint unlocking unit has been mounted to the touch control display panel, assembling a backlight module to the touch control display panel; and coating a glue on side surfaces of the mobile terminal touch control display structure corresponding to both sides of the mobile terminal.

\* \* \* \* \*